United States Patent
Andrade

(10) Patent No.: US 12,542,860 B2
(45) Date of Patent: Feb. 3, 2026

(54) SYSTEMS AND METHODS FOR CONVERTING A RASTER IMAGE INTO A PLURALITY OF VECTORS

(71) Applicant: Palantir Technologies Inc., Denver, CO (US)

(72) Inventor: Andrew Andrade, Mississauga (CA)

(73) Assignee: Palantir Technologies Inc., Denver, CO (US)

( * ) Notice: Subject to any disclaimer, the term of this patent is extended or adjusted under 35 U.S.C. 154(b) by 297 days.

(21) Appl. No.: 18/380,451

(22) Filed: Oct. 16, 2023

(65) Prior Publication Data
US 2024/0129421 A1    Apr. 18, 2024

Related U.S. Application Data

(60) Provisional application No. 63/441,476, filed on Jan. 27, 2023, provisional application No. 63/416,805, filed on Oct. 17, 2022.

(51) Int. Cl.
*H04N 1/60* (2006.01)
*G06T 7/11* (2017.01)
*G06T 7/90* (2017.01)
*G06V 10/56* (2022.01)

(52) U.S. Cl.
CPC ............... *H04N 1/60* (2013.01); *G06T 7/11* (2017.01); *G06T 7/90* (2017.01); *G06V 10/56* (2022.01); *G06T 2207/10024* (2013.01); *G06T 2207/20081* (2013.01)

(58) Field of Classification Search
CPC .... H04N 1/60; G06T 7/11; G06T 7/90; G06T 2207/10024; G06T 2207/20081; G06V 10/56; G06V 20/10
See application file for complete search history.

(56) References Cited

U.S. PATENT DOCUMENTS

2023/0154075 A1* 5/2023 Tailang ................. G06F 18/23
345/442

OTHER PUBLICATIONS

Andrade, Andrew, et al. University of Waterloo, "Numerical Approximation of the Inverse Standardized Loss Function for Inventory Control Subject to Uncertain Demand", Canadian Operations Research Society, 2016.

* cited by examiner

*Primary Examiner* — Christopher Wait
(74) *Attorney, Agent, or Firm* — Faegre Drinker Biddle & Reath LLP

(57) ABSTRACT

Systems and methods for converting a raster image with a corresponding color scale into a plurality of vectors are provided. An example method includes receiving the raster image and the color scale. In some embodiments, the color scale includes a plurality of colors and a plurality of unit values. In certain embodiments, each color of the plurality of colors corresponds to a unit value of the plurality of unit values. In some embodiments, the raster image includes a plurality of pixels each corresponding to a pixel color. In certain embodiments, each color of the plurality of colors is segmented into a plurality of color channel values. In some embodiments, a model is trained to convert a color to a vector value based on the plurality of segmented color channel values for each color of the plurality of colors and the plurality of unit values. In certain embodiments, the plurality of vectors are generated and each include a vector location, a geometric shape, and a vector value.

20 Claims, 10 Drawing Sheets
(4 of 10 Drawing Sheet(s) Filed in Color)

SYSTEMS AND METHODS FOR CONVERTING A RASTER IMAGE INTO A PLURALITY OF VECTORS

CROSS REFERENCE TO RELATED APPLICATIONS

This application claims priority to U.S. Provisional Application Nos. 63/441,476 and 63/416,805, both entitled "SYSTEMS AND METHODS FOR CONVERTING A RASTER IMAGE INTO A PLURALITY OF VECTORS," filed on Jan. 27, 2023 and Oct. 17, 2022, respectively, which are incorporated by reference herein for all purposes in their entirety.

TECHNICAL FIELD

Certain embodiments of the present disclosure relate to converting a raster image into a plurality of vectors. More particularly, some embodiments of the present disclosure relate to converting a raster image associated with a geographic location on a map into a plurality of vectors, such as based on a color scale associated with the raster image.

BACKGROUND

Raster images are composed of pixels and are typically used for photographs and/or complex images with varying shades of color. Comparatively, vector images are composed of geometric shapes defined by one or more mathematical equations. Vector images are resolution independent, which means they can be resized to different dimensions without a loss of quality. In some examples, determining values of colored pixels in a raster image, as may be necessary to convert the raster image to a vector image, requires visual inspection of the colored pixels. In some examples, the visual inspection can be a difficult and/or inefficient process to determine to which colors/values the colored pixel correspond. Further, a color scale against which the colored pixels are being compared may have a color gradient and/or associated values that are non-linear, thereby making a conversion between colors and values, based on the color scale, relatively complex.

Hence, it is desirable to improve techniques for converting a raster image into a plurality of vectors.

SUMMARY

Certain embodiments of the present disclosure relate to converting a raster image into a plurality of vectors. More particularly, some embodiments of the present disclosure relate to converting a raster image associated with a geographic location on a map into a plurality of vectors, such as based on a color scale associated with the raster image.

At least some aspects of the present disclosure are directed to a method for converting a raster image with a corresponding color scale into a plurality of vectors. In some embodiments, the method includes receiving the raster image and the color scale. In some embodiments, the color scale includes a plurality of colors and a plurality of unit values associated with a property. In some embodiments, each color of the plurality of colors correspond to a unit value of the plurality of unit values. In some embodiments, the raster image includes a plurality of pixels that each correspond to a pixel color. In some embodiments, the method includes segmenting each color of the plurality of colors into a plurality of color channel values corresponding to a plurality of color channels in a color space of the color scale. In some embodiments, the method includes training a model based on the plurality of segmented color channel values for each color of the plurality of colors and the plurality of unit values. In some embodiments, the trained model is configured to convert a color to a vector value. In some embodiments, the method includes generating the plurality of vectors. In some embodiments, each vector of the plurality of vectors includes a vector location, a geometric shape corresponding to one or more pixels of the plurality of pixels, and a vector value determined based on one or more pixel colors corresponding to the one or more pixels using the trained model. In some embodiments, the method is performed using one or more processors.

At least some aspects of the present disclosure are directed to a system for converting a raster image with a corresponding color scale into a plurality of vectors. In some embodiments, the system includes one or more processors and one or more memories storing instructions that, when executed by the one or more processors, cause the system to perform a set of operations. In some embodiments, the set of operations include receiving the raster image and the color scale. In some embodiments, the color scale includes a plurality of colors and a plurality of unit values associated with a property. In some embodiments, each color of the plurality of colors correspond to a unit value of the plurality of unit values. In some embodiments, the raster image includes a plurality of pixels that each correspond to a pixel color. In some embodiments, the set of operations includes segmenting each color of the plurality of colors into a plurality of color channel values corresponding to a plurality of color channels in a color space of the color scale. In some embodiments, the set of operations includes training a model based on the plurality of segmented color channel values for each color of the plurality of colors and the plurality of unit values. In some embodiments, the trained model is configured to convert a color to a vector value. In some embodiments, the set of operations includes generating the plurality of vectors. In some embodiments, each vector of the plurality of vectors includes a vector location, a geometric shape corresponding to one or more pixels of the plurality of pixels, and a vector value determined based on one or more pixel colors corresponding to the one or more pixels using the trained model.

At least some aspects of the present disclosure are directed to a method for converting a raster image with a corresponding color scale into a plurality of vectors. In some embodiments, the method includes receiving the raster image and the color scale. In some embodiments, the color scale includes a plurality of colors and a plurality of unit values associated with a property. In some embodiments, each color of the plurality of colors correspond to a unit value of the plurality of unit values. In some embodiments, the raster image includes a plurality of pixels that each correspond to a pixel color. In some embodiments, the method includes segmenting each color of the plurality of colors into a plurality of color channel values corresponding to a plurality of color channels in a color space of the color scale. In some embodiments, the method includes training a model based on the plurality of segmented color channel values for each color of the plurality of colors and the plurality of unit values. In some embodiments, the trained model is configured to convert a color to a vector value. In some embodiments, the method includes determining a goodness of fit of the trained model is valid, and determining a pixel unit value for each pixel of the plurality of pixels in the raster image, using the trained model, based at least in part upon a pixel color of the each pixel. In some embodiments, the method includes generating the plurality of vectors. In some embodiments, each vector of the plurality of vectors includes a vector location, a geometric shape corresponding to one or more pixels of the plurality of pixels, and a vector value determined based on one or more pixel colors corresponding to the one or more pixels using the trained model. In some embodiments, the vector value is determined based at least in part upon one or more pixel unit values of the one or more pixels. In some embodiments, the method is performed using one or more processors.

Depending upon embodiment, one or more benefits may be achieved. These benefits and various additional objects, features and advantages of the present disclosure can be fully appreciated with reference to the detailed description and accompanying drawings that follow.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
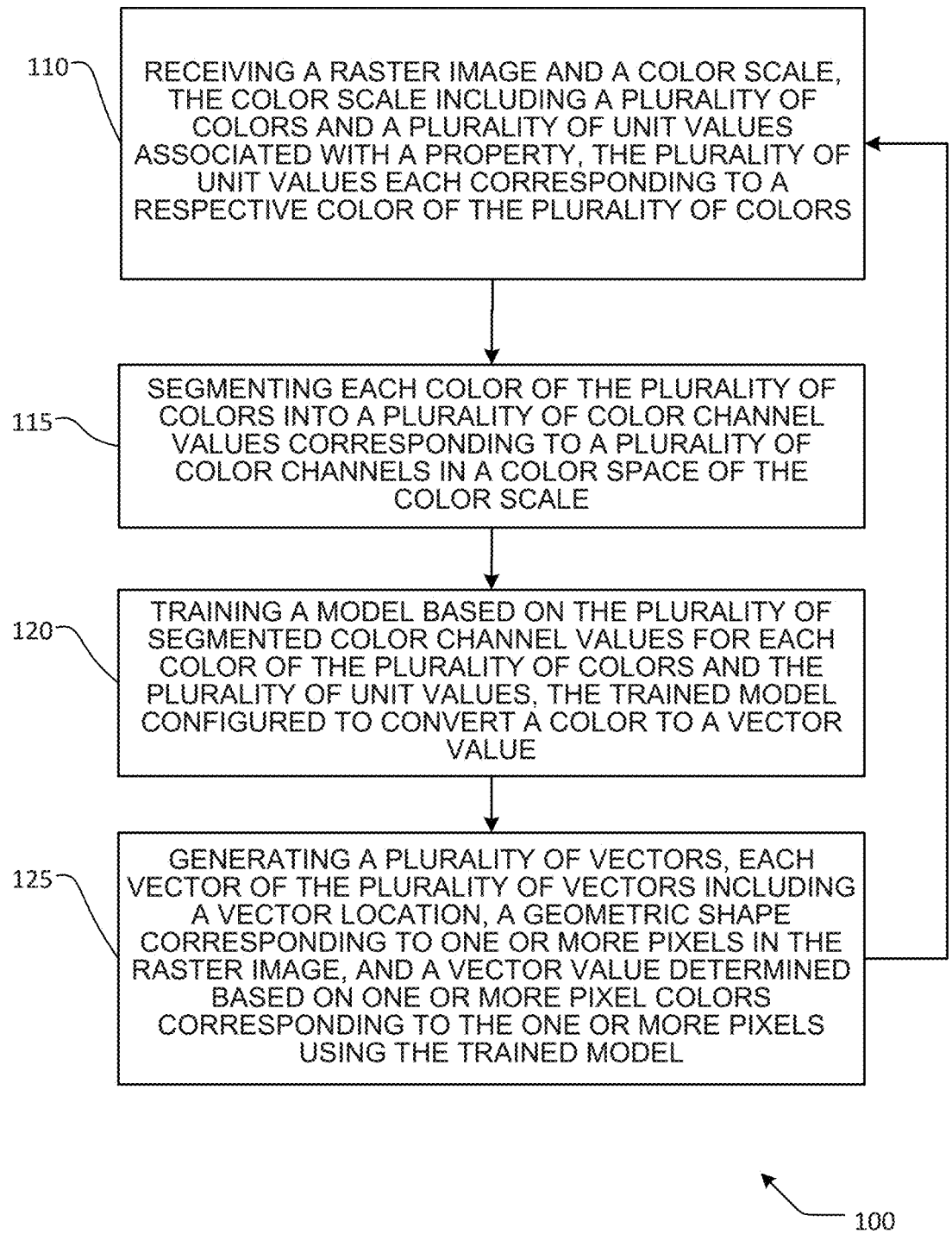
FIG. 1 illustrates a simplified diagram showing a method for converting a raster image into a plurality of vectors according to certain embodiments of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Although illustrative methods may be represented by one or more drawings (e.g., flow diagrams, communication flows, etc.), the drawings should not be interpreted as implying any requirement of, or particular order among or between, various steps disclosed herein. However, some embodiments may require certain steps and/or certain orders between certain steps, as may be explicitly described herein and/or as may be understood from the nature of the steps themselves (e.g., the performance of some steps may depend on the outcome of a previous step). Additionally, a "set," "subset," or "group" of items (e.g., inputs, algorithms, data values, etc.) may include one or more items and, similarly, a subset or subgroup of items may include one or more items. A "plurality" means more than one.

As used herein, the term "based on" is not meant to be restrictive, but rather indicates that a determination, identification, prediction, calculation, and/or the like, is performed by using, at least, the term following "based on" as an input. For example, predicting an outcome based on a particular piece of information may additionally, or alternatively, base the same determination on another piece of information. As used herein, the term "receive" or "receiving" means obtaining from a data repository (e.g., database), from another system or service, from another software, or from another software component in a same software. In certain embodiments, the term "access" or "accessing" means retrieving data or information, and/or generating data or information.

Conventional systems and methods are often not capable of effectively converting raster images to a plurality of vectors. Specifically, conventional systems may be unable to covert a raster image with a color scale to a plurality of vectors, when there are a greater number of colors for pixels of the raster image than a number of colors with corresponding values on the color scale. The inability of conventional systems may be due to the fact that mapping values to pixels based on a gradient color scale may require non-linear calculations (e.g., because hues of the gradient color scale does not uniformly increase/decrease with respect to unit values associated with the hues). Therefore, it may be difficult and/or inefficient to convert a raster image to vector values, such as because a visual inspection may be required. However, a visual inspection for mapping pixel colors of a raster image to value of a color scale can be tedious, inaccurate, and in some cases, inaccessible, such as for users who are visually impaired with blindness or color-blindness.

Various embodiments of the present disclosure can achieve benefits and/or improvements over conventional systems and methods by implementing conversions of a raster image into a plurality of vectors. For example, mechanisms provided herein may receive a raster image with a corresponding color scale that includes a plurality of colors and a plurality of unit values. In some examples, each color of the plurality of colors corresponds to a unit value of the plurality of unit values. In some examples, each color of the plurality of colors is segmented into a color channel value (e.g., a degree of red, a degree of blue, a degree of green, etc.). In certain examples, a model, which may include a polynomial curve fit, is trained to convert a color to a vector value based on the plurality of segmented color channel values. In some examples, the plurality of vectors are generated such that each vector includes a geometric shape corresponding to one or more pixels of the plurality of pixels and a vector value determined based on one or more pixel colors corresponding to the one or more pixels using the trained model.

In some embodiments, benefits include improved ease and/or efficiency for obtaining quantified values from raster images for further processing. Additionally, mechanisms described herein improve a user experience for users with disabilities. For example, a person who is visually impaired, or who is unable to differentiate between colors, may be unable to read values from a raster image based on a gradient color scale, but would then be able to read values using systems/methods provided herein. In some embodiments, benefits include being able to produce resolution independent vector images, which can be resized to different dimensions without a loss of quality. Additional and/or alternative advantages to those discussed herein may be recognized by those of ordinary skill in the art.

According to some embodiments, a color map gradient may be converted to graduated numerical units. Converting from grayscale to color, given a gradient scale, may be performed relatively easily, since the conversion would be a linear equation. However, converting from color to grayscale, given a gradient scale, may be relatively difficult. For example, converting a color map to grayscale, based on a gradient scale that includes colors may be a non-linear problem. Raster images may use different color gradients to map values. In certain embodiments, a raster image represents a two-dimensional image as a rectangular matrix or grid of square pixels. Once a raster image is produced it may be challenging to revert back to the original values upon which the raster image was generated without doing a visual inspection.

In some embodiments, determining values from a raster image that includes a plurality of different colors can be difficult and inefficient. For example, visually inspecting colored pixels on a raster image and trying to determine to which color(s) the color pixel matches or is closest can be a tedious and inaccurate process. Furthermore, in certain embodiments, visual inspection of colored pixels may be further complicated for users who are unable to perform visual inspections due to visual impairments, such as blindness or color-blindness.

Mechanisms described herein address the above-noted deficiencies and more. For example, mechanisms described herein improve ease and/or efficiency for obtaining quantified values from raster images for further processing. Additionally, mechanisms described herein improve a user experience for users with disabilities. For example, a person who is visually impaired, or who is unable to differentiate between colors, may be unable to read values from a raster image based on a gradient color scale. Additional and/or alternative advantages to those discussed herein may be recognized by those of ordinary skill in the art.

Some embodiments provided herein relate to systems and/or methods for converting a raster image with a corresponding color scale into a plurality of vectors with numerical values. In some embodiments, the raster image and the color scale may be received, for example, by a server and/or computing device. In some embodiments, the color scale may include a plurality of colors and a plurality of unit values associated with a property.

In some embodiments, the property may include various properties for different use cases. For example, the property may include a soil moisture. Additional or alternative properties may be related to topographical-uses, medical-uses, agricultural-uses, or any other uses that may be recognized by those of ordinary skill in the art for which a colored raster image may be provided.

Further, in some embodiments, the raster image may be any type of raster image that has a corresponding color scale. For example, the raster image may be received from a database or data repository of a commercial entity, government entity, research entity, medical entity, etc. Additionally, or alternatively, the raster image may be received from, or generated based on, a sensor, such as a LIDAR ("light detection and ranging") sensor, SONAR ("sound navigation and ranging") sensor, infrared sensor, etc.

In some embodiments, a model may be trained based on the raster image, and specifically based on color channel values into which each color of the plurality of colors from the raster image are segmented. In certain embodiments, the color channel values correspond to a plurality of color channels of a color space (e.g., red-green-blue (RGB) color space, cyan-magenta-yellow color space, etc.). In some embodiments, the trained model is used to generate the plurality of vectors. In some embodiments, each of the plurality of vectors may include a vector location and a geometric shape associated with one or more pixels and a vector value determined based upon one or more pixel colors corresponding to the one or more pixels. In certain embodiments, the plurality of vectors are used to generate a vector image.

Some embodiments provided herein include applying a spatial transformation to map a raster image and/or the vector image into a predetermined (e.g., correct) coordinate system. Additionally, or alternatively, a curve may be fit to a color gradient that maps to numerical values based on a discrete scale. Additionally, or alternatively, the raster image may be converted to vector layers, based on the curve. It should be recognized, in light of the present disclosure, that in some embodiments, the fit curve may instead be a trained model converting the raster image to vector layers based on discrete and/or continuous color scales. In certain embodiments, a trained model includes, for example, a machine learning model, a neural network model, a deep learning model, a curve-fitting function, a mathematical equation, a polynomial function, an algorithm (e.g., a nearest neighbor algorithm), and/or the like.

FIG. 1 is a simplified diagram showing a method 100 for converting a raster image with a corresponding color scale into a plurality of vectors with numerical values according to certain embodiments of the present disclosure. This diagram is merely an example. One of ordinary skill in the art would recognize many variations, alternatives, and modifications. The method 100 for converting a raster image with a corresponding color scale into a plurality of vectors includes processes 110, 115, 120, and 125. Although the above has been shown using a selected group of processes for the method 100 for converting a raster image with a corresponding color scale into a plurality of vector with numerical values, there can be many alternatives, modifications, and variations. For example, some of the processes may be expanded and/or combined. Other processes may be inserted into those noted above. Depending upon the embodiments, the sequence of processes may be interchanged with others replaced. Further details of these processes are found throughout the present disclosure.

According to some embodiments, at the process 110, a raster image conversion system (e.g., system 300 in FIG. 3) is configured to receive a raster image and a color scale. In some embodiments, the raster image and the color scale may be received by, for example, a computing device and/or a server. In some embodiments, the color scale includes a plurality of colors (e.g., 14 colors) and a plurality of unit values (e.g., 14 soil moisture values) associated with a property. In certain embodiments, each color of the plurality of colors corresponds to a unit value of the plurality of unit values. In some embodiments, each unit value of the plurality of unit values corresponds to a color of the plurality of colors. In certain embodiments, the number of the plurality of colors and the number of the plurality of unit values have a one-to-one mapping relationship. In some embodiments, each pixel in the raster images is corresponding to a pixel color in the color range defined by the plurality of colors. In certain embodiments, the plurality of unit values each corresponds to a respective color of the plurality of colors. In some embodiments, the plurality of unit values in the color scale includes a highest unit value and a lowest unit value.

In some embodiments, the property may be configurable for different use cases. In certain embodiments, the property may include one or more properties of different use cases. For example, the property may be a soil moisture. Additional and/or alternative properties may be related to topographical-uses, medical-uses, agricultural-uses, or any other uses that may be recognized by those of ordinary skill in the art for which a colored raster image may be provided.

Further, in some embodiments, the raster image may be any type of raster image that has a corresponding color scale. For example, the raster image may be received from a database of a commercial entity, government entity, research entity, medical entity, etc. Additionally, or alternatively, the raster image may be received from, or generated based on, a sensor, such as a LIDAR sensor, SONAR sensor, infrared sensor, etc.

In some embodiments, the plurality of colors include a first predetermined number of colors and the plurality of unit values correspond to a second predetermined number of colors. In some embodiments, the second predetermined number of colors is less than the first predetermined number of colors. In some embodiments, there are more colors present in the raster image than are the plurality of colors on the color scale. In certain embodiments, the pixel colors (e.g., 10,000 different pixel colors, 1,000,000,000 different pixel colors) of the plurality of pixels in the raster image are in the range (e.g., from red to blue) of the plurality of colors on the color scale but include many colors not in the plurality of colors (e.g., 13 colors) on the color scale.

According to some embodiments, at the process 115, the raster image conversion system segments each color of the plurality of colors into a plurality of color channel values that correspond to a plurality of color channels in a color space of the color scale. In some embodiments, the plurality of color channels may include one or more of red, blue, green, color channels. Additionally, or alternatively, in some embodiments, the color channels may include an alpha color channel that corresponds to a degree of transparency. Additional and/or alternative color channels (e.g., color channels in XYZ color space) may be recognized by those of ordinary skill in the art.

According to some embodiments, at the process 120, the raster image conversion system trains a model based on the plurality of segmented color channel values for each color of the plurality of colors and the plurality of unit values. In some embodiments, the trained model is configured to convert a color to a vector value.

In some embodiments training the model at the process 120 includes generating a polynomial curve fit. Additionally, or alternatively, in some embodiments, training the model at the process 120 includes applying a nearest neighbor analysis. Additionally, or alternatively, in some embodiments, training the model at the process 120 includes training a neural network. In some embodiments, the model may be trained based on discrete color scales and/or continuous color scales. In certain embodiments, a trained model includes, for example, a machine learning model, a neural network model, a deep learning model, a curve-fitting function, a mathematical equation, a polynomial function, an algorithm (e.g., a nearest neighbor algorithm), and/or the like. Additional and/or alternative types of models may be recognized by those of ordinary skill in the art.

In some embodiments, the process 120 further includes determining a goodness of fit for the model. For example, the goodness of fit of the trained model may be calculated using statistical analysis recognized by those of ordinary skill in the art based on, for example, the plurality of segmented color channel values and the plurality of unit values. In some embodiments, the determined goodness of fit may be compared to a predetermined validity threshold to determine if the trained model is valid. For example, if the determined goodness of fit is above the predetermined validity threshold, then the trained model may be determined to be valid. As another example, if the determined goodness is below the predetermined validity threshold, then the trained model may be determined to be invalid. Subsequent processing in the method 100 may not be performed if the trained model is determined to be invalid.

According to some embodiments, at the process 125, the raster image conversion system generates a plurality of vectors. In some embodiments, each vector of the plurality of vectors includes a vector location and a geometric shape associated with one or more pixels and a vector value converted from one or more pixel colors corresponding the one or more pixels using the trained model. In some embodiments, the plurality of vector values in the plurality of vectors that correspond to the plurality of colors represent a distribution of the plurality of unit values of the property (e.g., soil moisture values). In certain embodiments, the system determines a pixel unit value for each pixel in the raster image using the trained model based at least in part upon a pixel color of the each pixel. In some embodiments, the determined pixel unit values are in the range of the plurality of unit values on the color scale. In certain embodiments, the determined pixel unit values are not higher than the highest unit value of the plurality of unit values. In some embodiments, the determined pixel unit values are not lower than the lowest unit value of the plurality of unit values. In certain embodiments, the number of the determined pixel unit values (e.g., 10,000 determined pixel unit values, 1,000,000 pixel unit values) are greater than the number of the plurality of unit values (e.g., 13 unit values).

In some embodiments, the raster image conversion system determines the vector value of one vector of the plurality of vectors based at least in part upon one or more pixel unit values of the one or more pixels corresponding to the geometric shape of the one vector of the plurality of vectors. In some embodiments, the plurality of vectors may then be returned, so that further processing can be performed on the plurality of vectors.

In some embodiments, each pixel in the raster image is associated with a geographic location on a map, as may be defined with geographic coordinates, such as latitudinal and/or longitudinal coordinates, geohash values, etc. Additionally, or alternatively, in some embodiments, the location associated with the pixel is a geometric location on an image, as may be defined with length measurements, such as height, width, and/or depth (e.g., for 3-dimensional images).

In some embodiments, the plurality of colors include a plurality of first colors, and a plurality of second colors (e.g., which are different from the plurality of first colors, grayscale colors) are assigned to the vector data (e.g., the plurality of vector values) In some embodiments, a visualization of the plurality of second colors may be generated based at least in part on the vector location and the geometric shape in each vector of the plurality of vectors. Additionally, or alternatively, in some embodiments, the plurality of vector values may be converted into a plurality of grayscale values. In some embodiments, a grayscale map (e.g., visualization) may then be presented based on the plurality of grayscale values.

In some embodiments, method 100 may terminate at process 125. In some embodiments, method 100 may return to process 110 (or any other process from method 100) to provide an iterative loop, such as of receiving a raster image and a color scale, and generating a plurality of vectors corresponding to each color on the raster image and a plurality of colors and unit values of the color scale.

Figure 2:
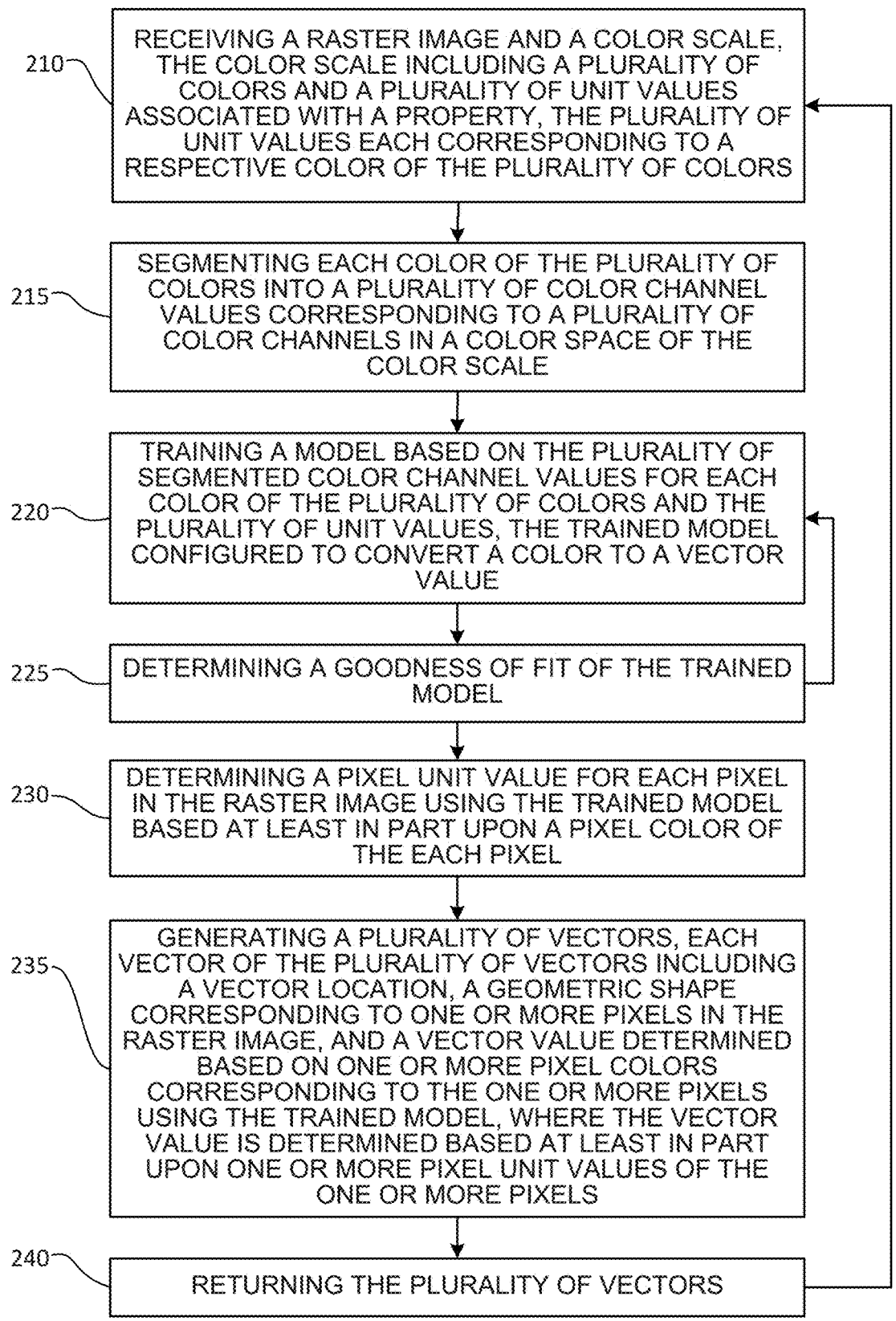
FIG. 2 illustrates a simplified diagram showing a method for converting a raster image into a plurality of vectors according to certain embodiments of the present disclosure.

FIG. 2 is a simplified diagram showing a method 200 for converting a raster image with a corresponding color scale into a plurality of vectors with numerical values according to certain embodiments of the present disclosure. This diagram is merely an example. One of ordinary skill in the art would recognize many variations, alternatives, and modifications. The method 200 for converting a raster image with a corresponding color scale into a plurality of vectors with numerical values includes processes 210, 215, 220, 225, 230, 235, and 240. Although the above has been shown using a selected group of processes for the method 200 for converting a raster image with a corresponding color scale into a plurality of vector with numerical values, there can be many alternatives, modifications, and variations. For example, some of the processes may be expanded and/or combined. Other processes may be inserted into those noted above. Depending upon the embodiments, the sequence of processes may be interchanged with others replaced. Further details of these processes are found throughout the present disclosure.

According to some embodiments, at the process 210, a raster image conversion system (e.g., system 300 in FIG. 3) is configured to receive a raster image and a color scale. In some embodiments, the raster image and the color scale may be received by, for example, a computing device and/or a server. In some embodiments, the color scale includes a plurality of colors (e.g., 14 colors) and a plurality of unit values (e.g., 14 soil moisture values) associated with a property. In certain embodiments, each color of the plurality of colors corresponds to a unit value of the plurality of unit values. In some embodiments, each unit value of the plurality of unit values corresponds to a color of the plurality of colors. In certain embodiments, the number of the plurality of colors and the number of the plurality of unit values have a one-to-one mapping relationship. In some embodiments, each pixel in the raster images is corresponding to a pixel color in the color range defined by the plurality of colors. In certain embodiments, the plurality of unit values each corresponds to a respective color of the plurality of colors. In some embodiments, the plurality of unit values in the color scale includes a highest unit value and a lowest unit value.

In some embodiments, the property may be configurable for different use cases. In certain embodiments, the property may include one or more properties of different use cases. For example, the property may be a soil moisture. Additional and/or alternative properties may be related to topographical-uses, medical-uses, agricultural-uses, or any other uses that may be recognized by those of ordinary skill in the art for which a colored raster image may be provided.

Further, in some embodiments, the raster image may be any type of raster image that has a corresponding color scale. For example, the raster image may be received from a database of a commercial entity, government entity, research entity, medical entity, etc. Additionally, or alternatively, the raster image may be received from, or generated based on, a sensor, such as a LIDAR sensor, SONAR sensor, infrared sensor, etc.

In some embodiments, the plurality of colors include a first predetermined number of colors and the plurality of unit values correspond to a second predetermined number of colors. In some embodiments, the second predetermined number of colors is less than the first predetermined number of colors. In some embodiments, there are more colors present in the raster image than are the plurality of colors on the color scale. In certain embodiments, the pixel colors (e.g., 10,000 different pixel colors, 1,000,000,000 different pixel colors) of the plurality of pixels in the raster image are in the range (e.g., from red to blue) of the plurality of colors on the color scale but include many colors not in the plurality of colors (e.g., 13 colors) on the color scale.

According to some embodiments, at the process 215, the raster image conversion system segments each color of the plurality of colors into a plurality of color channel values that correspond to a plurality of color channels in a color space of the color scale. In some embodiments, the plurality of color channels may include one or more of red, blue, green, color channels. Additionally, or alternatively, in some embodiments, the color channels may include an alpha color channel that corresponds to a degree of transparency. Additional and/or alternative color channels (e.g., color channels in XYZ color space) may be recognized by those of ordinary skill in the art.

According to some embodiments, at the process 220, the raster image conversion system trains a model based on the plurality of segmented color channel values for each color of the plurality of colors and the plurality of unit values. In some embodiments, the trained model is configured to convert a color to a vector value.

In some embodiments training the model at the process 220 includes generating a polynomial curve fit. Additionally, or alternatively, in some embodiments, training the model at the process 220 includes applying a nearest neighbor analysis. Additionally, or alternatively, in some embodiments, training the model at the process 220 includes training a neural network. In some embodiments, the model may be trained based on discrete color scales and/or continuous color scales. In certain embodiments, a trained model includes, for example, a machine learning model, a neural network model, a deep learning model, a curve-fitting function, a mathematical equation, a polynomial function, an algorithm (e.g., a nearest neighbor algorithm), and/or the like. Additional and/or alternative types of models may be recognized by those of ordinary skill in the art.

According to some embodiments, at the process 225, the raster image conversion system determines a goodness of fit of the trained model. In some embodiments, the goodness of fit of the trained model may be calculated using statistical analysis recognized by those of ordinary skill in the art based on, for example, the plurality of segmented color channel values and the plurality of unit values. In some embodiments, the determined goodness of fit may be compared to a predetermined validity threshold to determine if the trained model is valid. For example, if the determined goodness of fit is above the predetermined validity threshold, then the trained model may be determined to be valid. As another example, if the determined goodness is below the predetermined validity threshold, then the trained model may be determined to be invalid. In some embodiments, subsequent processing in the method 200 may not be performed if the trained model is determined to be invalid. In some embodiments, method 200 may return to process 220, from process 225, such as when the trained model is determined to be invalid.

According to some embodiments, at the process 230, the raster image conversion system determines a pixel unit value for each pixel in the raster image using the trained model based at least in part upon a pixel color of the each pixel. In some embodiments, the determined pixel unit values are in the range of the plurality of unit values on the color scale. In certain embodiments, the determined pixel unit values are not higher than the highest unit value of the plurality of unit values. In some embodiments, the determined pixel unit values are not lower than the lowest unit value of the plurality of unit values. In certain embodiments, the number of the determined pixel unit values (e.g., 10,000 determined pixel unit values, 1,000,000 pixel unit values) are greater than the number of the plurality of unit values (e.g., 13 unit values).

According to some embodiments, at the process 235, the raster image conversion system generates a plurality of vectors. In some embodiments, each vector of the plurality of vectors includes a vector location and a geometric shape corresponding to one or more pixels in the raster image and a vector value determined based on one or more pixel colors corresponding to the one or more pixels using the trained model, where the vector value is determined based at least in part upon or more pixel unit values of the one or more pixels. In some embodiments, the plurality of vector values in the plurality of vectors that correspond to the plurality of colors represent a distribution of the plurality of unit values of the property (e.g., soil moisture values).

According to some embodiments, at the process 240, the raster image conversion system returns the plurality of vectors. In some embodiments, further processing can be performed on the returned plurality of vectors.

In some embodiments, each pixel in the raster image is associated with a geographic location on a map, as may be defined with geographic coordinates, such as latitudinal and/or longitudinal coordinates, geohash values, etc. Additionally, or alternatively, in some embodiments, the location associated with the pixel is a geometric location on an image, as may be defined with length measurements, such as height, width, and/or depth (e.g., for 3-dimensional images).

In some embodiments, the plurality of colors are a plurality of first colors, and a plurality of second colors (e.g., which are different from the plurality of first colors, grayscale colors) are assigned to the vector data (e.g., the plurality of vector values) In some embodiments, a visualization of the plurality of second colors may be generated based at least in part on the vector location and the geometric shape in each vector of the plurality of vectors. Additionally, or alternatively, in some embodiments, the plurality of vector values may be converted into a plurality of grayscale values. In some embodiments, a grayscale map (e.g., visualization) may then be presented based on the plurality of grayscale values.

In some embodiments, method 200 may terminate at process 240. In some embodiments, method 200 may return to process 210 (or any other process from method 200) to provide an iterative loop, such as of receiving a raster image and a color scale, generating a plurality of vectors corresponding to each color on the raster image and a plurality of colors and unit values of the color scale, and returning the plurality of vectors.

Figure 3:
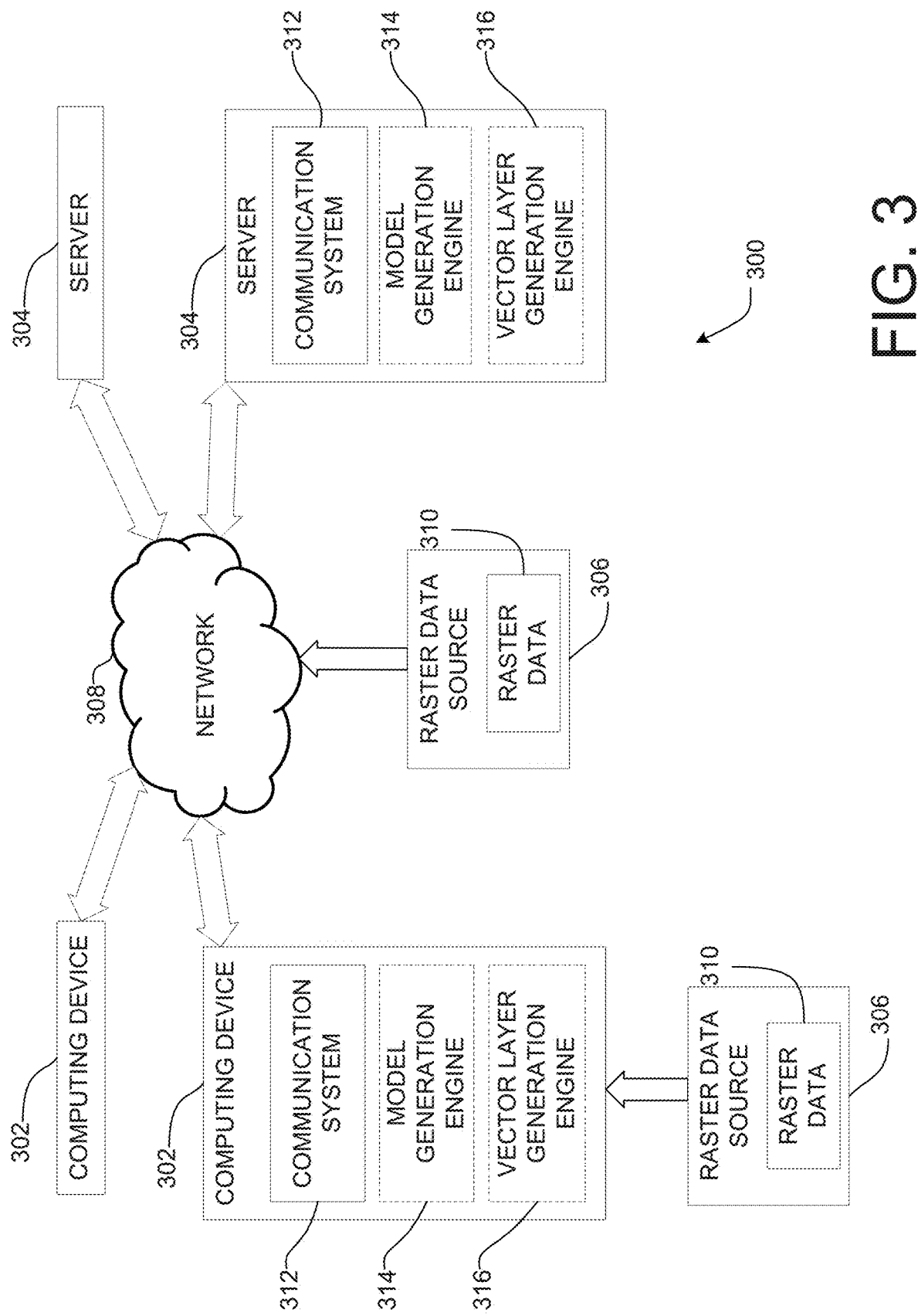
FIG. 3 illustrates an example of a system according to certain embodiments of the present disclosure.

FIG. 3 shows an example of a system 300, in accordance with some aspects of the disclosed subject matter. In some embodiments, the system 300 may be a raster image conversion system for converting a raster image with a corresponding color scale into a plurality of vectors with numerical values. FIG. 3 is merely an example. One of the ordinary skilled in the art would recognize many variations, alternatives, and modifications. Although system 300 has been shown using a selected group of components, there can be many alternatives, modifications, and variations. For example, some of the components may be expanded and/or combined. Other components may be inserted into those noted above. Depending upon the example, the arrangement of components may be interchanged with others replaced. Further details of these components are found throughout the present disclosure.

In some embodiments, various components in the system 300 can execute software or firmware stored in non-transitory computer-readable medium to implement various processing steps. In some embodiments, various components and processors of the system 300 can be implemented by one or more computing devices including, but not limited to, circuits, a computer, a cloud-based processing unit, a processor, a processing unit, a microprocessor, a mobile computing device, and/or a tablet computer. In some embodiments, various components of the system 300 can be implemented on a shared computing device. In some embodiments, a component of the system 300 can be implemented on multiple computing devices. In some embodiments, various modules and components of the system 300 can be implemented as software, hardware, firmware, or a combination thereof. In some embodiments, various components of the image scoring environment 300 can be implemented in software or firmware executed by a computing device.

In some embodiments, the system 300 includes one or more computing devices 302, one or more servers 304, a raster data source 306, and a communication network or network 308. In some embodiments, the computing device 302 can receive raster data 310 from the raster data source 306. Additionally, or alternatively, in some embodiments, the network 308 can receive raster data 310 from the raster data source 306.

In some embodiments, computing device 302 may include a communication system 312, a model generation engine or component 314, and/or a vector layer generation engine or component 316. In some embodiments, computing device 302 can execute at least a portion of the model generation component 314 train, fit, or otherwise generate a model to convert a color to a numerical value. Further, in some embodiments, the computing device 302 can execute at least a portion of the vector layer generation component 316 to generate vector components from the numerical values determined from the model generation component 314. Additionally, or alternatively, in some embodiments, the computing device 302 can execute at least a portion of the vector layer generation component 316 to generate a timeseries of the vector components.

In some embodiments, server 304 may include a communication system 312, a model generation engine or component 314, and/or a vector layer generation engine or component 316. In some embodiments, the server 304 can execute at least a portion of the model generation component 314 train, fit, or otherwise generate a model to convert a color to a numerical value. Further, in some embodiments, the server 304 can execute at least a portion of the vector layer generation component 316 to generate vector components from the numerical values determined from the model generation component 314. Additionally, or alternatively, in some embodiments, the server 304 can execute at least a portion of the vector layer generation component 316 to generate a timeseries of the vector components.

Additionally, or alternatively, in some embodiments, computing device 302 can communicate data received from raster data source 306 to the server 304 over a communication network 308, which can execute at least a portion of the model generation component 314, and/or the vector layer generation component 316. In some embodiments, the model generation component 314 may execute one or more portions of methods/processes 100 and/or 200 described above in connection with FIGS. 1 and/or 2. Further in some embodiments, the vector layer generation component 316 may execute one or more portions of methods/processes 100 and/or 200 described above in connection with FIGS. 1 and/or 2.

In some embodiments, computing device 302 and/or server 304 can be any suitable computing device or combination of devices, such as a desktop computer, a vehicle computer, a mobile computing device (e.g., a laptop computer, a smartphone, a tablet computer, a wearable computer, etc.), a server computer, a virtual machine being executed by a physical computing device, a web server, etc. Further, in some embodiments, there may be a plurality of computing device 302 and/or a plurality of servers 304.

In some embodiments, raster data source 306 can be any suitable source of raster data (e.g., data generated from a computing device, data stored in a repository, etc.) In some embodiments, raster data source 306 can include memory storing raster data (e.g., local memory of computing device 302, local memory of server 304, cloud storage, portable memory connected to computing device 302, portable memory connected to server 304, etc.). In some embodiments, raster data source 306 can include an application configured to generate raster data. In some embodiments, raster data source 306 can be local to computing device 302. Additionally, or alternatively, in some embodiments, raster data source 306 can be remote from computing device 302, and can communicate raster data 310 to computing device 302 (and/or server 304) via a communication network (e.g., communication network 308).

In some embodiments, the raster data source 306 may include a repository that is implemented using any one of the configurations described below. In some embodiments, a data repository may include random access memories, flat files, XML files, and/or one or more database management systems (DBMS) executing on one or more database servers or a data center. In some embodiments, a database management system may be a relational (RDBMS), hierarchical (HDBMS), multidimensional (MDBMS), object oriented (ODBMS or OODBMS) or object relational (ORDBMS) database management system, and the like. In some embodiments, the data repository may be, for example, a single relational database. In some embodiments, the data repository may include a plurality of databases that can exchange and aggregate data by data integration process or software application. In some embodiments, at least part of the data repository may be hosted in a cloud data center. In some embodiments, a data repository may be hosted on a single computer, a server, a storage device, a cloud server, or the like. In some embodiments, a data repository may be hosted on a series of networked computers, servers, or devices. In some embodiments, a data repository may be hosted on tiers of data storage devices including local, regional, and central.

In some embodiments, the raster data 310 may correspond to a raster image with a corresponding color scale. In some embodiments, the raster image that corresponds to the raster data 310 may be a two-dimensional image. In some embodiments, the raster image that corresponds to the raster data 310 may be a three-dimensional image. Further, in some embodiments, the raster image that corresponds to the raster data 310 may be a stream of raster images that each correspond to the same color scale.

In some embodiments, communication network 308 can be any suitable communication network or combination of communication networks. For example, communication network 308 can include a Wi-Fi network (which can include one or more wireless routers, one or more switches, etc.), a peer-to-peer network (e.g., a Bluetooth network), a cellular network (e.g., a 3G network, a 4G network, a 5G network, etc., complying with any suitable standard), a wired network, etc. In some embodiments, communication network 308 can be a local area network (LAN), interfaces conforming known communications standard, such as Bluetooth® standard, IEEE 802 standards (e.g., IEEE 802.11), a ZigBee® or similar specification, such as those based on the IEEE 802.15.4 standard, a wide area network (WAN), a public network (e.g., the Internet), a private or semi-private network (e.g., a corporate or university intranet), any other suitable type of network, or any suitable combination of networks. In some embodiments, communication links (arrows) shown in FIG. 3 can each be any suitable communications link or combination of communication links, such as wired links, fiber optics links, Wi-Fi links, Bluetooth® links, cellular links, satellite links, etc.

Figure 4:
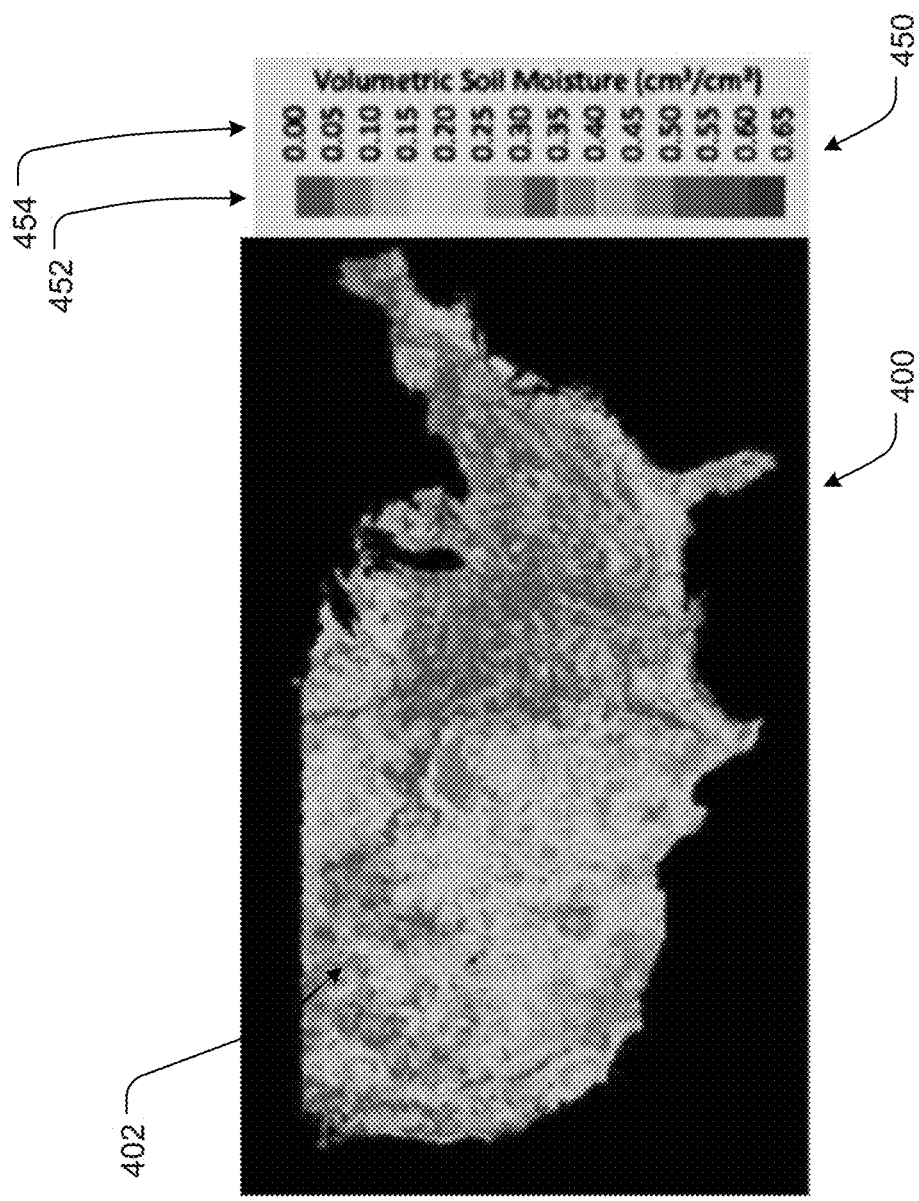
FIG. 4 illustrates an example raster image and corresponding color scale according to certain embodiments of the present disclosure.

FIG. 4 illustrates an example raster image 400 and corresponding color scale 450 according to some aspects described herein. In some embodiments, the raster image 400 includes a plurality of pixels 402 that each contain a color or hue. In some embodiments, the example raster image 400 is a map of the United States with colors that represent soil moisture values for specific plots of land. Accordingly, in some embodiments, the color scale 450 includes a plurality of colors 452 and a plurality of unit values 454 associated with a property, which, in the example raster image 400, is volumetric soil moisture.

In some embodiments, the plurality of colors 452 include thirteen colors and the plurality of unit values 454 include fourteen unit values. Further, in some embodiments, the pixels 402 collectively include more than thirteen colors. Accordingly, in some embodiments, determining a unit value for each of the pixels 402, based on the scale 450 that includes thirteen colors 452 and fourteen unite values 454 will require interpolation between the colors 452 and the unit values 454. In some embodiments, such interpolation is non-linear, and therefore difficult to perform (e.g., accurately and/or quickly).

In some embodiments, mechanisms described herein may be applied to the example raster image 400 to automatically convert the raster image 400 into a plurality of vector (e.g., vector geo-polygons) and match a color or hue of the color scale 450 to actual (unit labelled) numerical values from the plurality of vectors. In some embodiments, such mechanisms can be implemented in data pipelines to do geospatial joins to get numerical values for statistical and/or scientific analysis and modeling.

Referring still to FIG. 4, in some embodiments, geographic-based soil moisture values are available through raster data sources that are public, such as government repositories. However, in some embodiments, the raster data from the government repositories are in the form of raster images, such as portable network graphics (PNGs), that are produced daily from a model which uses sensor data to produce the example raster image 400.

Plotting the information from the example raster image 400 on a map, as shown in the raster image 400, may be undesirable. For example, one may want to be able to determine, relatively quickly, what the soil moisture is in a specific plot of land, without having to use the color scale 450, and use the soil moisture for further processing, such as correlation with other events. For example, by zooming into the raster image 400 and trying to look up a specific coordinate (e.g., the centroid of a farm), one could use their eyes and the color scale 450 to get the value for soil moisture at the specific coordinate (e.g., the centroid of the farm). Furthermore, relying on the raster image 400 to determine soil moisture values may be difficult, if not impossible, for individuals who are visually impaired (e.g., blind or colorblind). Accordingly, conventional methods of determining unit values (e.g., soil moisture values) from a raster image (e.g., the raster image 400) based on a corresponding color scale (e.g., the color scale 450) are tedious, inefficient, and unusable for individuals who are visually impaired.

In some embodiments, mechanisms described herein provide the ability to provide a location (e.g., a coordinate, such as may include latitude and/or longitudinal points) to receive a corresponding unit value that is associated with a property (e.g., soil moisture), automatically. While the example raster image 400 and corresponding color scale 450 are described with respect to the United States, government repositories, and soil moisture values, it should be recognized that mechanisms described herein may be applied to other types of raster images (e.g., medical images, sensor images, topological images, etc.) that are received from any of a plurality of different raster data sources.

In some embodiments, mechanisms described herein may take the color scale 450 (that includes the plurality of colors 452 and the plurality of unit values 454) to create a gradient mapping with a plurality of color channel values (e.g., red, green, blue, etc.). In some embodiments, the gradient mapping can then be graduated to give a color (e.g., red, green, blue, or alpha value) that is a corresponding unit value (e.g., volumetric soil moisture value from 0.00-0.65 $cm^3/cm^3$). For example, if a pixel from the pixels 402 is fairly blue with an RGB (red, green, blue) value of (10, 0, 200), then one might expect the soil moisture to be around 0.63 $cm^3/cm^3$.

In some embodiments, the mapping of the gradient to the unit values associated with the property (e.g., volumetric soil moisture) can then be applied either by a curve or model fit to the gradient. In some embodiments, the mapping may be applied by performing a nearest neighbor analysis. In some embodiments, the chosen method/model for mapping the gradient to the unit values associated with the property may be dependent on the specific gradient, and on which method model has the best curve fit and/or goodness of fit, based on known data points of unit values and corresponding color values. In some embodiments, the mapping of color values to unit values can be applied for every pixel 452 on the raster image 400 of FIG. 4. Further, in some embodiments, the mapping of color values to unit values can be used to generate a plurality of vectors that each correspond to a respective one of the pixels 402 and that may be queried based on latitudinal points, longitudinal points, and/or polygonal shapes (e.g., in a format for encoding geographic data structures, such as GeoJSON).

Figure 5:
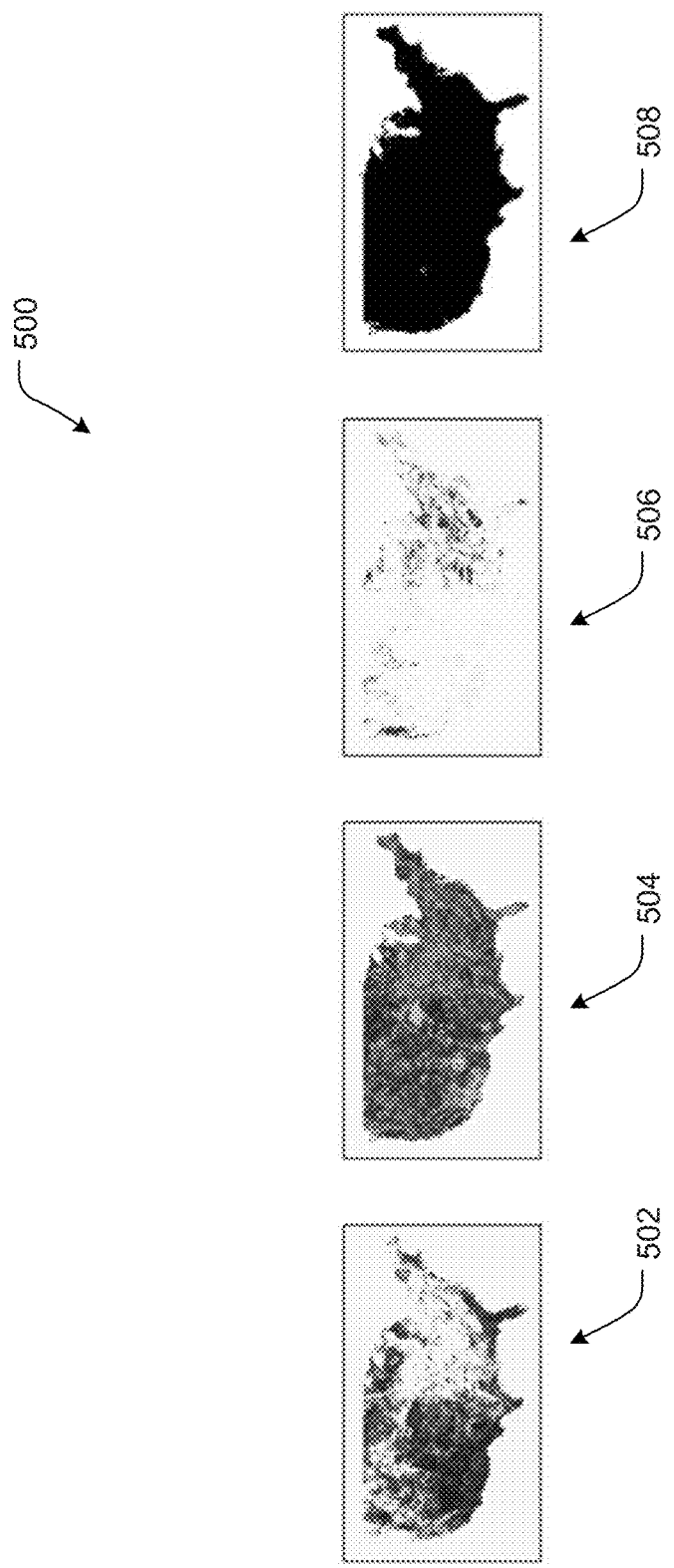
FIG. 5 illustrates an example plurality of color layers according to certain embodiments of the present disclosure.

FIG. 5 illustrates an example plurality of color layers 500. In some embodiments, the plurality of color layers 500 include a first color layer 502, a second color layer 504, a third color layer 506, and a fourth color layer 508. In some embodiments, the plurality of color layers 500 may be generated by segmenting each color of the pixels 402 into a plurality of color channel values (e.g., red, green, blue, alpha) that correspond to a plurality of color channels in a color space of the color scale 450.

In some embodiments, the first color layer 502 is based on the red channel value of the respective color of each pixel 402 from the raster image 400 illustrated in FIG. 4. In some embodiments, the second color layer 504 is based on the green channel value of the respective color of each pixel 402 from the raster image 400 illustrated in FIG. 4. In some embodiments, the third color layer 506 is based on the blue channel value of the respective color of each pixel 402 from the raster image 400 illustrated in FIG. 4. Further, in some embodiments, the fourth color layer is based on the alpha value (e.g., degree of transparency) of the respective color of each pixel 402 from the raster image 400 illustrated in FIG. 4.

Additional and/or alternative color layers may be recognized by those of ordinary skill in the art based on additional and/or alternative color channels that may be desirable to segment color values based thereon. Further, in some embodiments, fewer than four color layers may be used to select or train the method/model by which a plurality of vectors are generated that each include a location associated with a pixel and a vector value converted from a color at the pixel.

Figure 6:
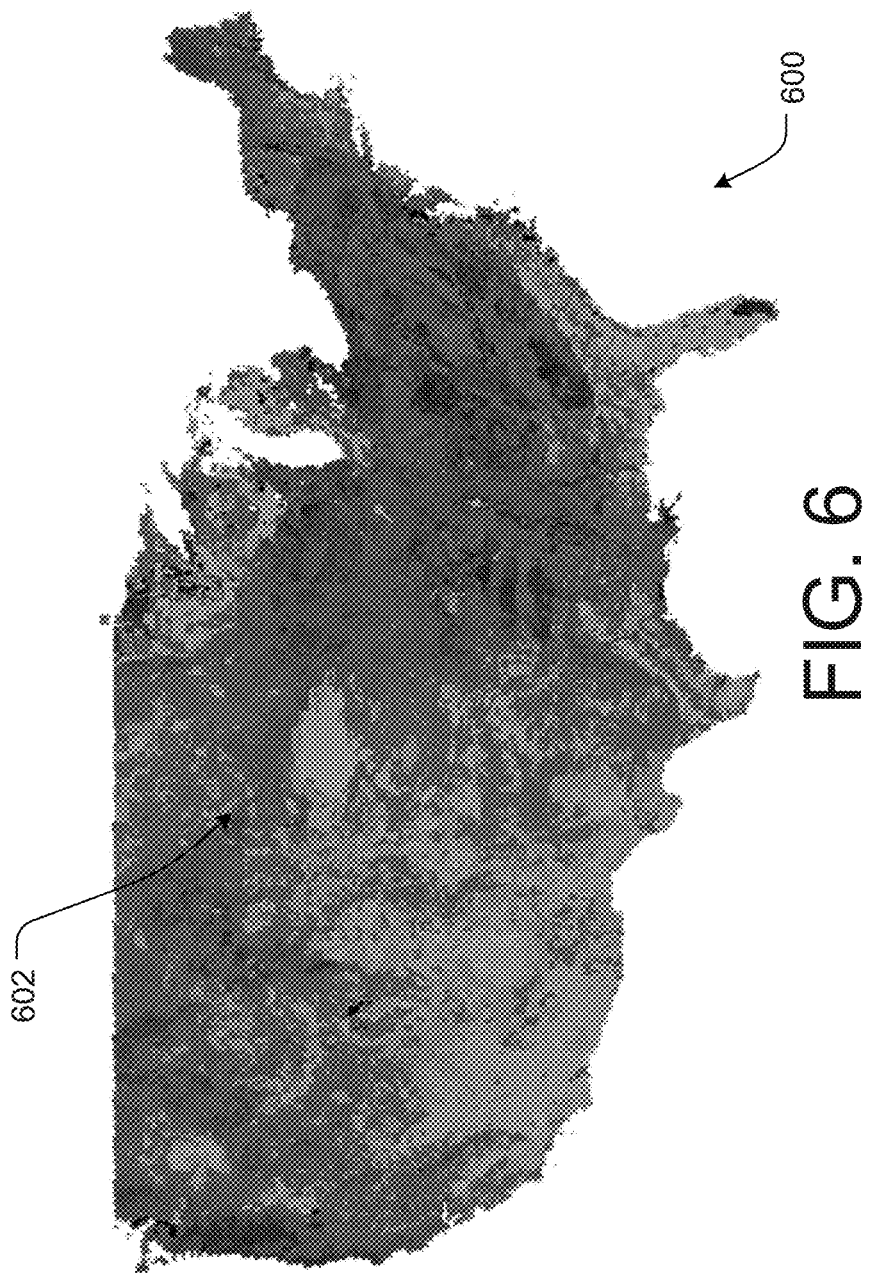
FIG. 6 illustrates an example greyscale image that is generated according to certain embodiments of the present disclosure.

FIG. 6 illustrates an example greyscale image 600 that is generated according to some aspects described herein. In some embodiments, the example greyscale image 600 is a geographical map of the United States. In some embodiments, the curve/model fit discussed above with respect to FIG. 4 may be used to generate the greyscale image 600. In some embodiments, the greyscale image 600 includes a plurality of pixels 602 that each include a respective intensity value. In some embodiments, the intensity of the "grey" in each image linearly corresponds to the unit value with the associated property. For example, when the associated property is soil moisture, the lightest pixels of the pixels 602 may correspond to relatively low soil moisture values. In some embodiments, the darkest pixels of the pixels 602 may correspond to relatively high soil moisture values. For example, a first pixel of the pixels 602 with a first intensity value of 255, out of a maximum intensity of 255, will correspond to 0.65 $cm^3/cm^3$, while a second pixel of the pixels 602 with a second intensity value of 127 would correspond to 0.325 $cm^3/cm^3$.

Figure 7:
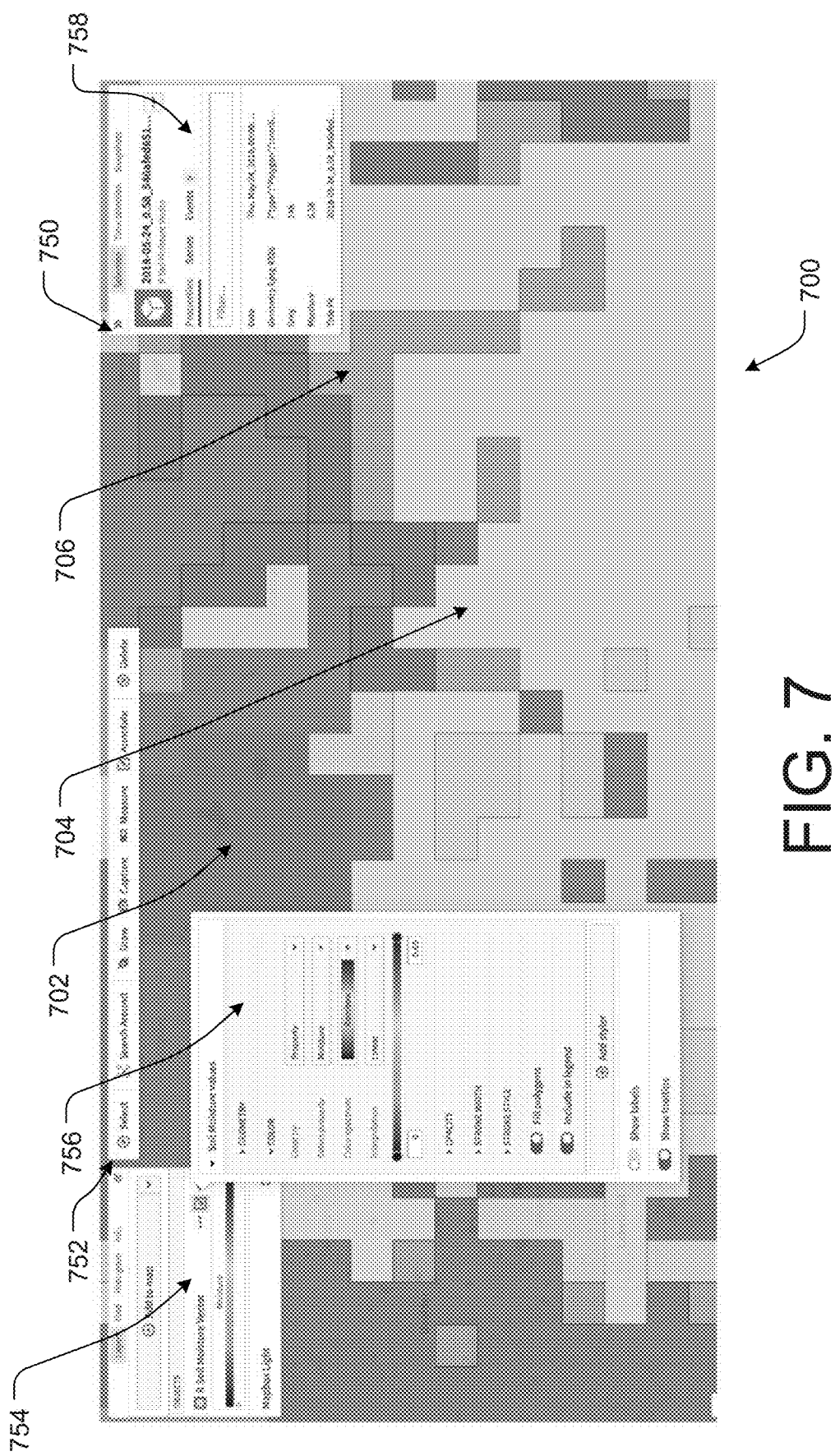
FIG. 7 illustrates an example plurality of polygon vectors that is generated according to certain embodiments of the present disclosure.

FIG. 7 illustrates an example plurality of polygon vectors 700 according to some aspects described herein. In some embodiments, the plurality of polygon vectors 700 include a first polygon vector 702, a second polygon vector 704, and a third polygon vector 706.

In some embodiments, the greyscale image 600 may be converted into the plurality of polygon vectors 700 using a format for encoding geographic data structures, such as GeoJSON. In some embodiments, the plurality of polygon vectors 700 may be generated for each of the greyscale intensities for each of the pixels 602 of the greyscale image 600. In some embodiments, the raster image 400 may be converted directly into the plurality of polygon vectors 700, without having to generate the greyscale image 600.

In some embodiments, the plurality of polygon vectors 700 allow for a user to quickly and easily determine (e.g., via looking-up in a user-interface, such as that interfaces with a database, or that displays a graphical visualization) the expected unit value associated with the property (e.g., soil moisture value) for a specific location (e.g., geographic location). For example, the United States Department of Agriculture estimates that the moisture on the grass at the White House is about 0.345 cm$^3$/cm$^3$ on 2018, 05, 24.

In some embodiments, the plurality of polygon vector 700 may include a time to which an associated unit value corresponds. Accordingly, in some embodiments, the plurality of polygon vectors 700 may be used in a timeseries, and mechanisms herein may plot the unit values associated with the property (e.g., soil moisture values) over time. In some embodiments, the timeseries of the unit values associated with the property may be plotted and/or paired with other timeseries (e.g., crop yield, insurance payouts, etc.). In some embodiments, by pairing the timeseries of the unit values with other timeseries, correlations between datasets may be quickly estimated for valuable conclusions to be drawn based thereon.

In some embodiments, the first polygon vector 702, the second polygon vector 704, and the third polygon vector 706 may each be associated with a color region (e.g., a plurality of pixels from the pixels 402 and/or pixels 602 that are adjacent and that have the same color). In some embodiments, a difference threshold may be applied between neighboring pixels to determine if they should be grouped within the same color region. For example, if two pixels are adjacent and have respective intensity values that differ by less than five units, then the two pixels may be determined to have a similar enough color to be grouped within the same color region.

In some examples, colors may be assigned to color regions based on the intensity value of pixels within the color regions. For example, the polygon vectors 700 may be displayed on a user-interface 750, such as a graphical user-interface (GUI). In certain examples, the user-interface includes a function bar 752, such as to select, pan/tilt/zoom, draw, capture, measure, annotate, and/or delete content from the user-interface 750. For example, using the function bar 752, one or more of the polygon vectors 700 can be selected. As another example, a user can pan, tilt, and/or zoom across/into the polygon vectors 700 of a map (e.g., map 900 of FIG. 9). As another example, a user can measure a distance across a polygon vector of the polygon vectors 700 and/or measure a distance between two or more polygon vectors of the polygon vectors 700. As another example, a user can draw, write, and/or type across the polygon vectors 700. In some examples, a user can delete the content that they draw, write, and/or type across the polygon vectors.

In some examples, the user-interface 750 includes an input component 754. In certain examples, a color of one or more polygon vectors of the polygon vectors 700 is set via input to the input component 754. In some examples, the input component 754 includes a button, a slider, a drop-down menu, a text entry, and/or another type of feature for receiving user input indicative of color, as will be recognized by those of ordinary skill in the art.

In some examples, a selection of at least a portion of the input component 754 generates a detailed input component 756. In certain examples, the detailed input component 756 provides the ability to color pixels via unit values associated with a property (e.g., soil moisture value). In some examples, the user-interface 750 includes an information component 758. The information component 758 may include values associated with one or more polygon vector of the polygon vectors 700. For example, by selecting the first polygon vector 702, a location, color value, property unit value, and/or other information associated with the first polygon vector 702 may be displayed by the information component 758. As another example, by de-selecting the first polygon vector, and then selecting the second polygon vector 704, the information component 758 may replace the information associated with the first polygon vector 702 with information associated with the second polygon vector 704.

Figure 8B:
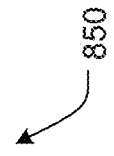
FIG. 8B illustrates an example table in which a calculated volumetric soil moisture is listed for each of a plurality of RGBA values, according to certain embodiments of the present disclosure.
Figure 8A:
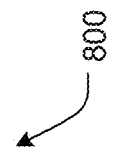
FIG. 8A illustrates an example table of RGBA (red, green, blue, alpha) values for hues from the color scale of FIG. 4 that are mapped to an equally spaced volumetric soil moisture, according to certain embodiments of the present disclosure.

FIG. 8A illustrates a first table 800 of RGBA (red, green, blue, alpha) values for the thirteen hues from the color scale 450 (see FIG. 4) that are mapped to an equally spaced volumetric soil moisture in cm$^3$/cm$^3$ (column "c"). In some embodiments, the model and/or method described herein for mapping colors to unit values may be applied by fitting a thin plate spline using a radial basis function. In some embodiments, the thin plate spline may be generated based on the function log(r)*x*r$^2$, as opposed to, for example, a simple polynomial function.

In the first table 800, the deep blue (7, 0, 143) is 0.65 cm$^3$/cm$^3$, and the deep red (203, 32, 29) is 0.00 cm$^3$/cm$^3$. In some embodiments, after the spline is fit to the points in the first table 800, then for every pixel (e.g., of pixels 402) of a raster image (e.g., image 400), the corresponding unit value (e.g., volumetric soil moisture value) may be calculated based on the respective pixel's RGBA (red, green, blue, alpha) value.

FIG. 8B illustrates a second table 850 in which a calculated volumetric soil moisture ("c_calculated") is listed for each of a plurality of RGBA values. In some embodiments, there is a relatively high volumetric soil moisture "c_calculated" for blue hues, while there is a relatively low volumetric soil moisture "c_calculated" for red hues.

In some embodiments, after mapping is applied for each pixel in a raster image, the raster image (e.g., raster image 400) is converted to a plurality of vectors, based on the volumetric soil moisture values "c_calculated" corresponding to each of the pixels (e.g., pixels 402).

Figure 9:
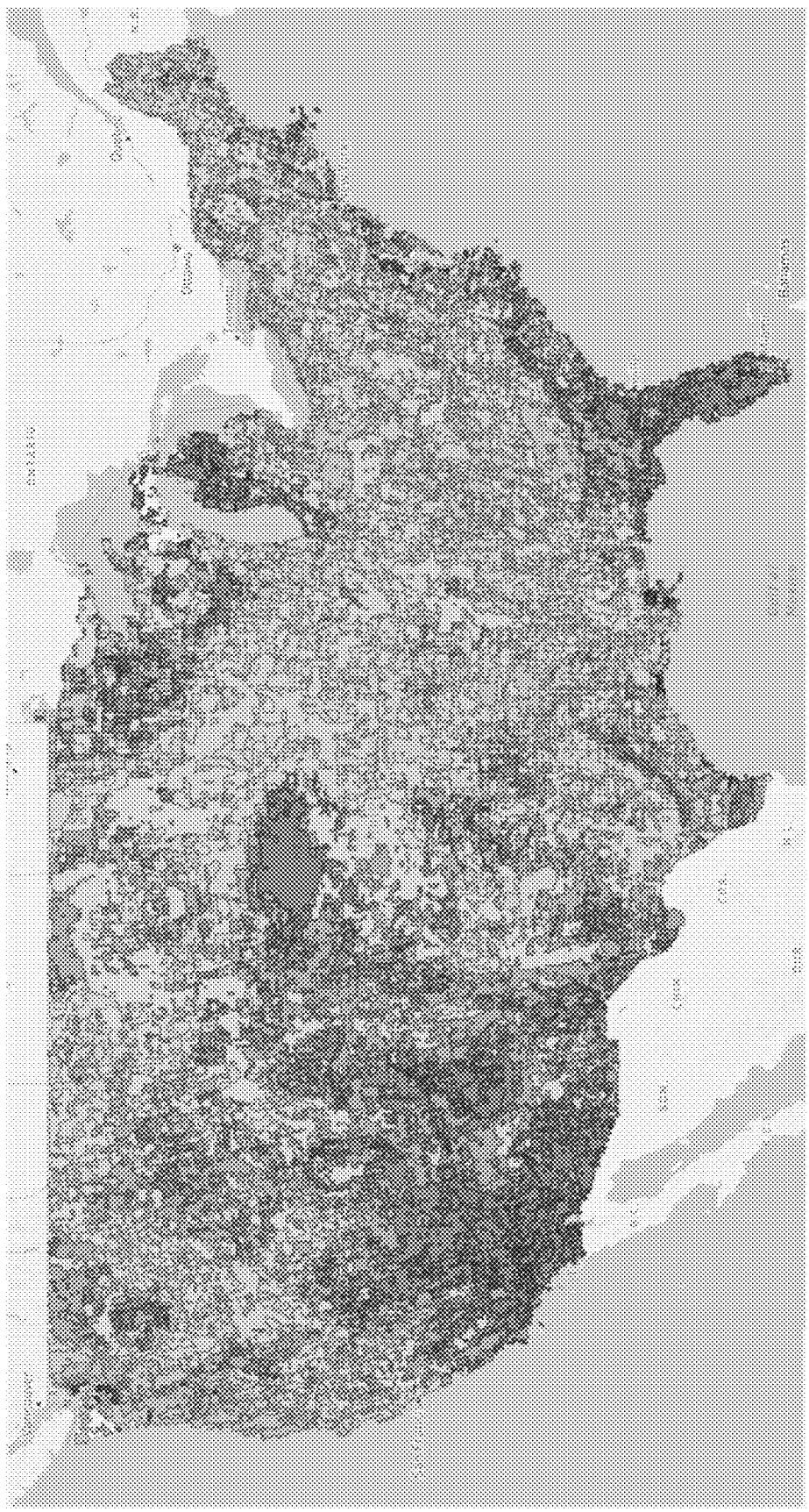
FIG. 9 illustrates an example map with a plurality of vectors plotted thereon, according to certain embodiments of the present disclosure.

In some embodiments, the plurality of vectors may then be plotted on a map using a configurable hue scale, as shown in an example map 900 of FIG. 9. For example, the input component 754 and/or detailed input component 756 of the user-interface 700 of FIG. 7 can be used to configure hue scales for different vector values of the map 900. As another example, a pre-determined mapping of hues to vector values may be provided, such as to configure hue scale for the different vector values of the map 900. Generally, in some examples, the map 900 illustrates a map of vectors that each have a location, a geometric shape, and a vector value. In some examples, the different colors at locations illustrated on map 900 provide a visual indication to a user of corresponding vector values at the locations.

Figure 10:
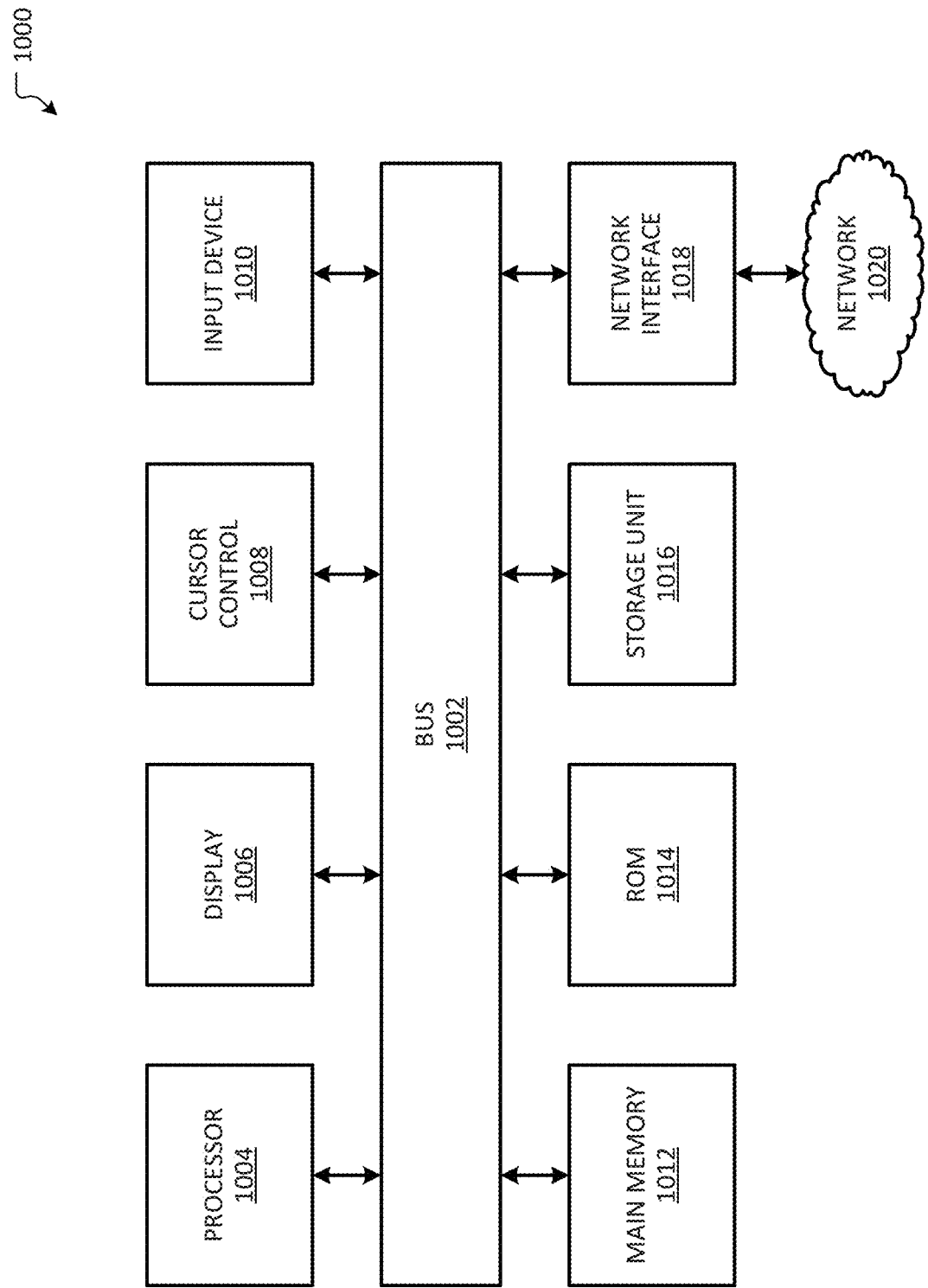
FIG. 10 illustrates a simplified diagram showing a computing system for implementing a system for converting a raster image into a plurality of vectors, according to certain embodiments of the present disclosure.

FIG. 10 is a simplified diagram showing a computing system for implementing a system 1000 for converting a raster image with a corresponding color scale into a plurality of vectors with numerical values in accordance with at least one example set forth in the disclosure. This diagram is merely an example, which should not unduly limit the scope of the claims. One of ordinary skill in the art would recognize many variations, alternatives, and modifications.

The computing system 1000 includes a bus 1002 or other communication mechanism for communicating information, a processor 1004, a display 1006, a cursor control component 1008, an input device 1010, a main memory 1012, a read only memory (ROM) 1014, a storage unit 1016, and a network interface 1018. In some embodiments, some or all processes (e.g., steps) of the methods 100, and/or 200 are performed by the computing system 1000. In some embodiments, the bus 1002 is coupled to the processor 1004, the display 1006, the cursor control component 1008, the input device 1010, the main memory 1012, the read only memory (ROM) 1014, the storage unit 1016, and/or the network interface 1018. In certain embodiments, the network interface is coupled to a network 1020. For example, the processor 1004 includes one or more general purpose microprocessors. In some embodiments, the main memory 1012 (e.g., random access memory (RAM), cache and/or other dynamic storage devices) is configured to store information and instructions to be executed by the processor 1004. In certain embodiments, the main memory 1012 is configured to store temporary variables or other intermediate information during execution of instructions to be executed by processor 1004. For example, the instructions, when stored in the storage unit 1016 accessible to processor 1004, render the computing system 1000 into a special-purpose machine that is customized to perform the operations specified in the instructions. In some embodiments, the ROM 1014 is configured to store static information and instructions for the processor 1004. In certain embodiments, the storage unit 1016 (e.g., a magnetic disk, optical disk, or flash drive) is configured to store information and instructions.

In some embodiments, the display 1006 (e.g., a cathode ray tube (CRT), an LCD display, or a touch screen) is configured to display information to a user of the computing system 1000. In some embodiments, the input device 1010 (e.g., alphanumeric and other keys) is configured to communicate information and commands to the processor 1004. For example, the cursor control component 1008 (e.g., a mouse, a trackball, or cursor direction keys) is configured to communicate additional information and commands (e.g., to control cursor movements on the display 1006) to the processor 1004.

According to certain embodiments, a method of converting a raster image with a corresponding color scale into a plurality of vectors is provided. The method includes: receiving the raster image and the color scale, the color scale including a plurality of colors and a plurality of unit values associated with a property, each color of the plurality of color colors each corresponding to a unit value of the plurality of unit values, the raster image including a plurality of pixels each corresponding to a pixel color; segmenting each color of the plurality of colors into a plurality of color channel values corresponding to a plurality of color channels in a color space of the color scale; training a model based on the plurality of segmented color channel values for each color of the plurality of colors and the plurality of unit values, the trained model configured to convert a color to a vector value; and generating the plurality of vectors, each vector of the plurality of vectors including a vector location, a geometric shape corresponding to one or more pixels of the plurality of pixels, and a vector value determined based on one or more pixel colors corresponding to the one or more pixels using the trained model, wherein the method is performed using one or more processors. For example, the method is implemented according to at least FIG. 1 and/or FIG. 2.

In some embodiments, the method further comprises returning the plurality of vectors. In some embodiments, the generating the plurality of vectors comprises: determining a pixel unit value for each pixel in the raster image using the trained model based at least in part upon a pixel color of the each pixel; and determining the vector value of one vector of the plurality of vectors based at least in part upon one or more pixel unit values of the one or more pixels corresponding to the geometric shape of the one vector of the plurality of vectors. In certain embodiments, the plurality of colors are a plurality of first colors, wherein a plurality of second colors are assigned to a plurality of vector values of the plurality of vectors, and wherein a visualization using the plurality of second colors is generated based at least in part on the vector location and the geometric shape in each vector of the plurality of vectors. In some embodiments, each pixel in the raster image is associated with a geographic location on a map. In certain embodiments, at least one pixel color of the plurality of pixel colors corresponding to the plurality of pixels is not any one of the plurality of colors in the color scale.

In some embodiments, the training a model comprises determining a goodness of fit of the trained model. In certain embodiments, the method further comprises converting a plurality of vector values in the plurality of vectors into a plurality of grayscale values; and generating a grayscale map using the plurality of grayscale values based at least in part on the vector location and the geometric shape in each vector of the plurality of vectors. In some embodiments, the training a model comprises at least one of generating a polynomial curve fit or applying a nearest neighbor analysis. In certain embodiments, the property includes soil moisture, and the unit value includes a soil moisture value.

According to certain embodiments, a system for converting a raster image with a corresponding color scale into a plurality of vectors is provided. The system includes one or more processors and one or more memories storing instructions that, when executed by the one or more processors, cause the system to perform a set of operations, the set of operations including: receiving the raster image and the color scale, the color scale including a plurality of colors and a plurality of unit values associated with a property, each color of the plurality of color colors each corresponding to a unit value of the plurality of unit values, the raster image including a plurality of pixels each corresponding to a pixel color; segmenting each color of the plurality of colors into a plurality of color channel values corresponding to a plurality of color channels in a color space of the color scale; training a model based on the plurality of segmented color channel values for each color of the plurality of colors and the plurality of unit values, the trained model configured to convert a color to a vector value; and generating the plurality of vectors, each vector of the plurality of vectors including a vector location, a geometric shape corresponding to one or more pixels of the plurality of pixels, and a vector value determined based on one or more pixel colors corresponding to the one or more pixels using the trained model, wherein the method is performed using one or more processors. For example, the system is implemented according to at least FIG. 1, FIG. 2, and/or FIG. 3.

In some embodiments, the set of operations further comprises returning the plurality of vectors. In some embodiments, the generating the plurality of vectors comprises: determining a pixel unit value for each pixel in the raster image using the trained model based at least in part upon a pixel color of the each pixel; and determining the vector value of one vector of the plurality of vectors based at least in part upon one or more pixel unit values of the one or more pixels corresponding to the geometric shape of the one vector of the plurality of vectors. In certain embodiments, the plurality of colors are a plurality of first colors, wherein a plurality of second colors are assigned to a plurality of vector values of the plurality of vectors, and wherein a visualization using the plurality of second colors is generated based at least in part on the vector location and the geometric shape in each vector of the plurality of vectors. In some embodiments, each pixel in the raster image is associated with a geographic location on a map. In certain embodiments, at least one pixel color of the plurality of pixel colors corresponding to the plurality of pixels is not any one of the plurality of colors in the color scale.

In some embodiments, the training a model comprises determining a goodness of fit of the trained model. In certain embodiments, the set of operations further comprises converting a plurality of vector values in the plurality of vectors into a plurality of grayscale values; and generating a grayscale map using the plurality of grayscale values based at least in part on the vector location and the geometric shape in each vector of the plurality of vectors. In some embodiments, the training a model comprises at least one of generating a polynomial curve fit or applying a nearest neighbor analysis. According to certain embodiments, a method of converting a raster image with a corresponding color scale into a plurality of vectors is provided. The method includes: receiving the raster image and the color scale, the color scale including a plurality of colors and a plurality of unit values associated with a property, each color of the plurality of color colors each corresponding to a unit value of the plurality of unit values, the raster image including a plurality of pixels each corresponding to a pixel color; segmenting each color of the plurality of colors into a plurality of color channel values corresponding to a plurality of color channels in a color space of the color scale; training a model based on the plurality of segmented color channel values for each color of the plurality of colors and the plurality of unit values, the trained model configured to convert a color to a vector value; determining a goodness of fit of the trained model is valid; determining a pixel unit value for each pixel of the plurality of pixels in the raster image, using the trained model, based at least in part upon a pixel color of the each pixel; and generating the plurality of vectors, each vector of the plurality of vectors including a vector location, a geometric shape corresponding to one or more pixels of the plurality of pixels, and a vector value determined based on one or more pixel colors corresponding to the one or more pixels using the trained model, wherein the vector value is determined based at least in part upon one or more pixel unit values of the one or more pixels, wherein the method is performed using one or more processors. For example, the method is implemented according to at least FIG. 1 and/or FIG. 2.

For example, some or all components of various embodiments of the present disclosure each are, individually and/or in combination with at least another component, implemented using one or more software components, one or more hardware components, and/or one or more combinations of software and hardware components. In another example, some or all components of various embodiments of the present disclosure each are, individually and/or in combination with at least another component, implemented in one or more circuits, such as one or more analog circuits and/or one or more digital circuits. In yet another example, while the embodiments described above refer to particular features, the scope of the present disclosure also includes embodiments having different combinations of features and embodiments that do not include all of the described features. In yet another example, various aspects of the present disclosure can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system (e.g., one or more components of the processing system) to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD, etc.) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation and can be implemented, for example, as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present disclosure have been described, it will be understood by those of skill in the art that there are other embodiments that are equivalent to the described embodiments. Accordingly, it is to be understood that the invention is not to be limited by the specific illustrated embodiments. Various modifications and alterations of the disclosed embodiments will be apparent to those skilled in the art. The embodiments described herein are illustrative examples. The features of one disclosed example can also be applied to all other disclosed examples unless otherwise indicated. It should also be understood that all U.S. patents, patent application publications, and other patent and non-patent documents referred to herein are incorporated by reference, to the extent they do not contradict the foregoing disclosure.

What is claimed is:

1. A method of converting a raster image with a corresponding color scale into a plurality of vectors, the method comprising:
   receiving the raster image and the color scale, the color scale including a plurality of colors and a plurality of unit values associated with a property, each color of the plurality of colors each corresponding to a unit value of the plurality of unit values, the raster image including a plurality of pixels each corresponding to a pixel color;
   segmenting each color of the plurality of colors into a plurality of color channel values corresponding to a plurality of color channels in a color space of the color scale;
   training a model based on the plurality of segmented color channel values for each color of the plurality of colors and the plurality of unit values, the trained model configured to convert a color to a vector value; and
   generating the plurality of vectors, each vector of the plurality of vectors including a vector location, a geometric shape corresponding to one or more pixels of the plurality of pixels, and a vector value determined based on one or more pixel colors corresponding to the one or more pixels using the trained model;
   wherein the method is performed using one or more processors.

2. The method of claim 1, further comprising:
   returning the plurality of vectors.

3. The method of claim 1, wherein the generating the plurality of vectors comprises:
   determining a pixel unit value for each pixel in the raster image using the trained model based at least in part upon a pixel color of the each pixel; and
   determining the vector value of one vector of the plurality of vectors based at least in part upon one or more pixel unit values of the one or more pixels corresponding to the geometric shape of the one vector of the plurality of vectors.

4. The method of claim 1, wherein the plurality of colors are a plurality of first colors, wherein a plurality of second colors are assigned to a plurality of vector values of the plurality of vectors, and wherein a visualization using the plurality of second colors is generated based at least in part on the vector location and the geometric shape in each vector of the plurality of vectors.

5. The method of claim 1, wherein each pixel in the raster image is associated with a geographic location on a map.

6. The method of claim 1, wherein at least one pixel color of the plurality of pixel colors corresponding to the plurality of pixels is not any one of the plurality of colors in the color scale.

7. The method of claim 1, wherein the training a model comprises determining a goodness of fit of the trained model.

8. The method of claim 1, further comprising:
   converting a plurality of vector values in the plurality of vectors into a plurality of grayscale values; and
   generating a grayscale map using the plurality of grayscale values based at least in part on the vector location and the geometric shape in each vector of the plurality of vectors.

9. The method of claim 1, wherein the training a model comprises at least one of generating a polynomial curve fit or applying a nearest neighbor analysis.

10. The method of claim 1, wherein the property includes soil moisture, and wherein the unit value includes a soil moisture value.

11. A system for converting a raster image with a corresponding color scale into a plurality of vectors, the system comprising:
    one or more processors; and
    one or more memories storing instructions that, when executed by the one or more processors, cause the system to perform a set of operations, the set of operations comprising:
       receiving the raster image and the color scale, the color scale including a plurality of colors and a plurality of unit values associated with a property, each color of the plurality of colors each corresponding to a unit value of the plurality of unit values, the raster image including a plurality of pixels each corresponding to a pixel color;
       segmenting each color of the plurality of colors into a plurality of color channel values corresponding to a plurality of color channels in a color space of the color scale;
       training a model based on the plurality of segmented color channel values for each color of the plurality of colors and the plurality of unit values, the trained model configured to convert a color to a vector value; and
       generating the plurality of vectors, each vector of the plurality of vectors including a vector location, a geometric shape corresponding to one or more pixels of the plurality of pixels, and a vector value determined based on one or more pixel colors corresponding to the one or more pixels using the trained model.

12. The system of claim 11, wherein the set of operations further comprises:
    returning the plurality of vectors.

13. The system of claim 11, wherein the generating the plurality of vectors comprises:
    determining a pixel unit value for each pixel in the raster image using the trained model based at least in part upon a pixel color of the each pixel; and
    determining the vector value of one vector of the plurality of vectors based at least in part upon one or more pixel unit values of the one or more pixels corresponding to the geometric shape of the one vector of the plurality of vectors.

14. The system of claim 11, wherein the plurality of colors are a plurality of first colors, wherein a plurality of second colors are assigned to a plurality of vector values of the plurality of vectors, and wherein a visualization using the plurality of second colors is generated based at least in part on the vector location and the geometric shape in each vector of the plurality of vectors.

15. The system of claim 11, wherein each pixel in the raster image is associated with a geographic location on a map.

16. The system of claim 11, wherein at least one pixel color of the plurality of pixel colors corresponding to the plurality of pixels is not any one of the plurality of colors in the color scale.

17. The system of claim 11, wherein the training a model comprises determining a goodness of fit of the trained model.

18. The system of claim 11, wherein the set of operations further comprises:
converting a plurality of vector values in the plurality of vectors into a plurality of grayscale values; and
generating a grayscale map using the plurality of grayscale values based at least in part on the vector location and the geometric shape in each vector of the plurality of vectors.

19. The system of claim 11, wherein the training a model comprises at least one of generating a polynomial curve fit or applying a nearest neighbor analysis.

20. A method of converting a raster image with a corresponding color scale into a plurality of vectors, the method comprising:

receiving the raster image and the color scale, the color scale including a plurality of colors and a plurality of unit values associated with a property, each color of the plurality of colors each corresponding to a unit value of the plurality of unit values, the raster image including a plurality of pixels each corresponding to a pixel color;
segmenting each color of the plurality of colors into a plurality of color channel values corresponding to a plurality of color channels in a color space of the color scale;
training a model based on the plurality of segmented color channel values for each color of the plurality of colors and the plurality of unit values, the trained model configured to convert a color to a vector value;
determining a goodness of fit of the trained model is valid;
determining a pixel unit value for each pixel of the plurality of pixels in the raster image, using the trained model, based at least in part upon a pixel color of the each pixel; and
generating the plurality of vectors, each vector of the plurality of vectors including a vector location, a geometric shape corresponding to one or more pixels of the plurality of pixels, and a vector value determined based on one or more pixel colors corresponding to the one or more pixels using the trained model, wherein the vector value is determined based at least in part upon one or more pixel unit values of the one or more pixels,
wherein the method is performed using one or more processors.

* * * * *